US012802107B2

(12) United States Patent
Akhavizadegan et al.

(10) Patent No.: US 12,802,107 B2
(45) Date of Patent: Nov. 17, 2026

(54) SYSTEMS AND METHODS FOR INCREASING CUSTOMER REVIEWS

(71) Applicant: Walmart Apollo, LLC, Bentonville, AR (US)

(72) Inventors: Faezeh Akhavizadegan, Mountain View, CA (US); Hongyao Huang, Newark, CA (US); Yokila Arora, San Jose, CA (US); Atul Kochhar, Karnataka (IN); Sushant Kumar, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 27 days.

(21) Appl. No.: 19/030,332

(22) Filed: Jan. 17, 2025

(65) Prior Publication Data

US 2025/0259213 A1 Aug. 14, 2025

Related U.S. Application Data

(60) Provisional application No. 63/552,853, filed on Feb. 13, 2024.

(51) Int. Cl.
*G06Q 30/0202* (2023.01)
*G06N 3/0499* (2023.01)
*G06Q 30/0282* (2023.01)

(52) U.S. Cl.
CPC ....... *G06Q 30/0282* (2013.01); *G06N 3/0499* (2023.01); *G06Q 30/0202* (2013.01)

(58) Field of Classification Search
CPC ........... G06Q 30/0282; G06Q 30/0202; G06Q 30/0631; G06N 3/0499; G06N 3/045; G06N 3/08

(Continued)

(56) References Cited

U.S. PATENT DOCUMENTS 6,963,848 B1 11/2005 Brinkerhoff
8,108,255 B1 * 1/2012 Robinson ........... G06Q 30/0631 705/347

(Continued)

FOREIGN PATENT DOCUMENTS

KR 20200003459 A * 1/2020 ......... G06Q 30/0278

OTHER PUBLICATIONS

Runa Ganguli et al., "A Mathematical Recommendation Model to Rank Reviewers Based on Weighted Score for Online Review System", May 5, 2021; Emerging Technologies in Data Mining and Information Security. Lecture Notes in Networks and Systems, vol. 164, pp. 317-325 (Year: 2021).*

(Continued)

*Primary Examiner* — Shannon S Campbell
*Assistant Examiner* — Freda A Nelson
(74) *Attorney, Agent, or Firm* — Morgan, Lewis & Bockius LLP; Manita Rawat

(57) ABSTRACT

Systems and methods for predicting and motivating customers to provide reviews are disclosed. In some embodiments, a disclosed method includes: receiving, from a computing device, a request for potential reviewers; selecting, based on the request, a plurality of customers who have purchased items but have not provided any review for the purchased items; computing, using at least one machine learning model, review probabilities based on feature data related to the plurality of customers and transactions involving the purchased items, wherein each review probability is a probability of a corresponding customer providing a review; generating, from the plurality of customers, a ranked list of customers based on the review probabilities and reviewer segmentation data; and transmitting to the computing device the ranked list of customers to be reminded for providing reviews.

20 Claims, 11 Drawing Sheets

700

(58) Field of Classification Search
USPC .......................................................... 705/347
See application file for complete search history.

(56) References Cited

U.S. PATENT DOCUMENTS

| | | | | |
|---|---|---|---|---|
| 9,607,325 | B1 | 3/2017 | Sriram | |
| 10,417,671 | B2 * | 9/2019 | Berry | G06Q 30/0282 |
| 10,853,355 | B1 * | 12/2020 | Franson | G06Q 30/0282 |
| 2016/0267377 | A1 * | 9/2016 | Pan | G06F 40/30 |
| 2017/0024753 | A1 * | 1/2017 | Packer | G06Q 30/0202 |
| 2020/0218770 | A1 * | 7/2020 | Tu | G06N 20/00 |
| 2021/0004855 | A1 * | 1/2021 | Simon | G06Q 20/322 |
| 2021/0312493 | A1 * | 10/2021 | Taylor | G06N 3/04 |
| 2023/0177588 | A1 * | 6/2023 | Kant | G06Q 30/0282 705/26.7 |
| 2024/0319991 | A1 * | 9/2024 | Matthews | G06F 8/71 |
| 2024/0420180 | A1 * | 12/2024 | Qu | G06N 20/10 |

OTHER PUBLICATIONS

Wong, Rick, "Amazon Reviewer Ranking 101: How It Works", Mar. 15, 2021, sellermetrics.app, 18 pages. (Year: 2021).*

Dylan, "Turn Customers into Promoters," Zoho One, (Oct. 13, 2023), p. 1-20.

* cited by examiner

700

1100

SYSTEMS AND METHODS FOR INCREASING CUSTOMER REVIEWS

CROSS-REFERENCE TO RELATED APPLICATION

This application claims benefit to U.S. Provisional Application Ser. No. 63/552,853, entitled "SYSTEMS AND METHODS FOR INCREASING CUSTOMER REVIEWS," filed on Feb. 13, 2024, the disclosure of which is incorporated herein by reference in its entirety.

TECHNICAL FIELD

This application relates generally to customer engagement and, more particularly, to systems and methods for predicting and motivating customers to provide reviews of purchased items.

BACKGROUND

An e-commerce platform of a retailer may provide a large number of products for sale to customers over the Internet. In order to enhance the online shopping experience and to allow customers to fully research a particular product, the retailer can provide various product information, which might include a detailed description of the product, a list of features, technical specifications, as well as reviews of the product provided by other customers. The product reviews allow a potential purchaser to evaluate what other customers think about the product. The reviews may include a quantitative rating for a product, comments regarding another customer's experience and satisfaction with the product, and potentially other information.

Some study results have shown that an increase in product rating leads to an increase in product sales. In accordance with other study results, an increase in the number of reviews for an item leads to an increase in sales of the item. That is, customers have a propensity to purchase products with a greater number of reviews. It is with respect to these and other considerations that the disclosure made herein is presented.

SUMMARY

The embodiments described herein are directed to systems and methods for predicting and motivating customers to provide reviews of purchased items.

In various embodiments, a system including a non-transitory memory configured to store instructions thereon and at least one processor is disclosed. The at least one processor is operatively coupled to the non-transitory memory and configured to read the instructions to: receive, from a computing device, a request for potential reviewers; select, based on the request, a plurality of customers who have purchased items but have not provided any review for the purchased items; compute, using at least one machine learning model, review probabilities based on feature data related to the plurality of customers and transactions involving the purchased items, wherein each review probability is a probability of a corresponding customer providing a review; generate, from the plurality of customers, a ranked list of customers based on the review probabilities and reviewer segmentation data; and transmit to the computing device the ranked list of customers to be reminded for providing reviews In various embodiments, a computer-implemented method is disclosed. The computer-implemented method includes: receiving, from a computing device, a request for potential reviewers; selecting, based on the request, a plurality of customers who have purchased items but have not provided any review for the purchased items; computing, using at least one machine learning model, review probabilities based on feature data related to the plurality of customers and transactions involving the purchased items, wherein each review probability is a probability of a corresponding customer providing a review; generating, from the plurality of customers, a ranked list of customers based on the review probabilities and reviewer segmentation data; and transmitting to the computing device the ranked list of customers to be reminded for providing reviews.

In various embodiments, a non-transitory computer readable medium having instructions stored thereon is disclosed. The instructions, when executed by at least one processor, cause at least one device to perform operations including: receiving, from a computing device, a request for potential reviewers; selecting, based on the request, a plurality of customers who have purchased items but have not provided any review for the purchased items; computing, using at least one machine learning model, review probabilities based on feature data related to the plurality of customers and transactions involving the purchased items, wherein each review probability is a probability of a corresponding customer providing a review; generating, from the plurality of customers, a ranked list of customers based on the review probabilities and reviewer segmentation data; and transmitting to the computing device the ranked list of customers to be reminded for providing reviews.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
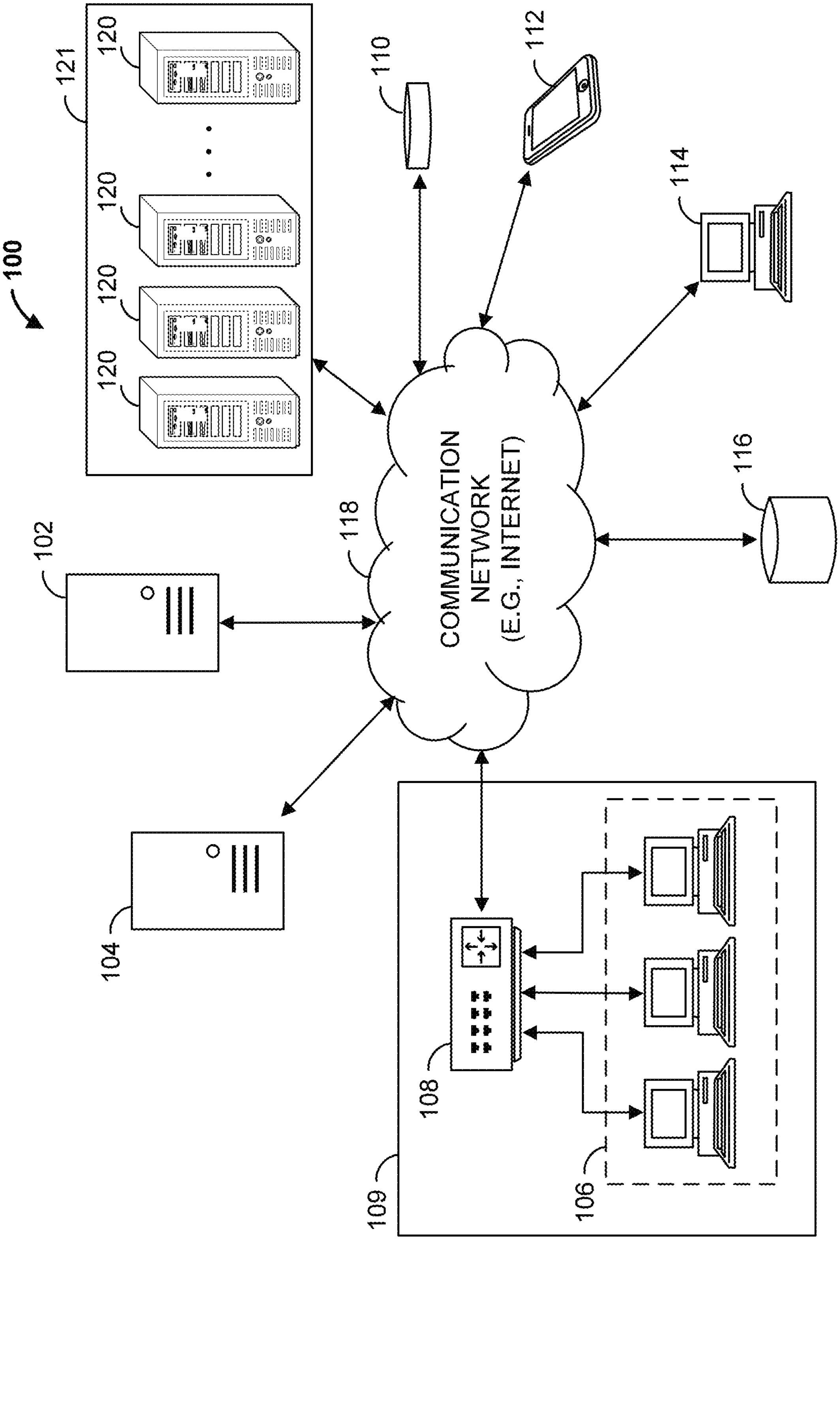
FIG. 1 is a network environment configured for predicting and motivating customers to provide item reviews, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

It is important for a retailer to motivate more customers to write more product reviews, because an increase of reviews leads to an increase of sales. Objectives of the present teaching include but not limited to: predicting customers who are likely to be reviewers, motivating these customers to write reviews with personalized nudges, and enabling data-driven decision-making by leveraging the personalized nudges.

In some embodiments, a system can predict a set of customers who have a higher affinity to write reviews for one or more product types. The prediction may be based on a machine learning model (e.g. a multi-task neural network) that can predict multiple review probabilities simultaneously for a customer regarding multiple product types, based on features related to customers and/or transactions. Each of the review probabilities is a probability of the customer providing a review in a respect product type.

In some embodiments, the system generates a ranked list of customers to be reminded for providing reviews, based on the review probabilities predicted for the customers. In some embodiments, both the review probability prediction and the customer ranking can be performed based on a customer segmentation (or reviewer segmentation), which categorizes customers based on their recency and frequency of reviews, allowing for tailored review motivation strategies. Nudges or review reminders can be sent to the ranked list of customers via various user interfaces, e.g. website, app, email. In some embodiments, the nudges may be sent with priority according to the ranking of the customers in consideration of any given budget.

As such, the disclosed system can provide a novel nudging and review reminding approach based on individual user behavior and preferences, ensuring a higher response rate. The customer segmentation enables the system to target precise potential reviewers, ensuring that nudges are directed at the most relevant customer segments. In addition, the disclosed system can leverage personalized nudging and customer segmentation to motivate customers to write reviews, drive exponential growth in review quantity, enhance user engagement, and empower a retailer to amplify customer voices. Furthermore, the framework of the system is flexible and adaptive to balance between exploration and exploitation, which can optimize the selection of potential reviewers by maximizing both diversity and authenticity of potential reviewers. Leveraging the unique insights gained from nudging data, potential reviewer data and realized reviewer data, the retailer can perform better data-driven decision-makings.

Furthermore, in the following, various embodiments are described with respect to systems and methods for predicting and motivating customers to provide reviews of purchased items are disclosed. In some embodiments, a disclosed method includes: receiving, from a computing device, a request for potential reviewers; selecting, based on the request, a plurality of customers who have purchased items but have not provided any review for the purchased items; computing, using at least one machine learning model, review probabilities based on feature data related to the plurality of customers and transactions involving the purchased items, wherein each review probability is a probability of a corresponding customer providing a review; generating, from the plurality of customers, a ranked list of customers based on the review probabilities and reviewer segmentation data; and transmitting to the computing device the ranked list of customers to be reminded for providing reviews.

Turning to the drawings, FIG. 1 is a network environment 100 configured for predicting and motivating customers to provide item reviews, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a reviewer prediction computing device 102, a server 104 (e.g., a web server or an application server), a cloud-based engine 121 including one or more processing devices 120, workstation(s) 106, a database 116, and one or more user computing devices 110, 112, 114 operatively coupled over the network 118. The reviewer prediction computing device 102, the server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the reviewer prediction computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the reviewer prediction computing device 102.

In some examples, each of the multiple user computing devices 110, 112, 114 can be a cellular phone, a smart phone, a tablet, a personal assistant device, a voice assistant device, a digital assistant, a laptop, a computer, a laser-based code scanner, or any other suitable device. In some examples, the server 104 hosts one or more websites or apps providing one or more products or services. In some examples, the reviewer prediction computing device 102, the processing devices 120, and/or the server 104 are operated by a retailer, and the multiple user computing devices 110, 112, 114 are operated by customers, associates and/or managers of the retailer. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109 of a retailer, for example. The workstation(s) 106 can communicate with the reviewer prediction computing device 102 over the communication network 118. The workstation(s) 106 may send data to, and receive data from, the reviewer prediction computing device 102. For example, the workstation(s) 106 may transmit data identifying items purchased by a customer at the store 109 to the reviewer prediction computing device 102. The workstation(s) 106 may also transmit other data related to the store 109 to the reviewer prediction computing device 102.

Although FIG. 1 illustrates three user computing devices 110, 112, 114, the network environment 100 can include any number of user computing devices 110, 112, 114. Similarly, the network environment 100 can include any number of the reviewer prediction computing devices 102, the processing devices 120, the workstations 106, the servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first user computing device 110, the second user computing device 112, and the Nth user computing device 114 may communicate with the server 104 over the communication network 118. For example, each of the multiple user computing devices 110, 112, 114 may be operable to view, access, and interact with a website, such as a retailer's website, hosted by the server 104. The server 104 may capture user session data related to a customer's activity (e.g., interactions) on the website.

In some examples, a customer may operate one of the user computing devices 110, 112, 114 to initiate a web browser that is directed to the website hosted by the server 104. The customer may, via the web browser, view item advertisements for items displayed on the website, may click on item advertisements, and may leave a review for an item, for example. The website may capture these activities as user session data, and transmit the user session data to the reviewer prediction computing device 102 over the communication network 118. The website may also allow the customer to add one or more of the items to an online shopping cart, and allow the customer to perform a "check-out" of the shopping cart to purchase the items. In some examples, the server 104 transmits purchase data identifying items the customer has purchased from the website to the reviewer prediction computing device 102.

In some examples, a customer may go to a store, e.g. the store 109 for purchasing items. The customer may use some payment method, e.g. a credit card or a payment app, at the store 109 to purchase one or more items. The workstation(s) 106 in the store 109 may capture these activities as in-store purchase data, and transmit the in-store purchase data to the reviewer prediction computing device 102 over the communication network 118, together with other store related data.

In some examples, the reviewer prediction computing device 102 may receive a reviewer prediction request for predicting potential reviewers from the server 104. The reviewer prediction request may be sent standalone or together with data associated with a product type or category. In response, the reviewer prediction computing device 102 generates a ranked list of customers as potential reviewers to be reminded for providing reviews under the product type. The ranked list of customers may be generated based on some review probabilities, budget data and reviewer segmentation data.

In some examples, the reviewer prediction computing device 102 may execute one or more models (e.g., programs or algorithms), such as a machine learning model, deep learning model, statistical model, etc., to generate a ranked list of customers to be reminded for providing reviews. The reviewer prediction computing device 102 may generate and transmit the ranked list of customers to the server 104 over the communication network 118, and the server 104 may send nudges or review reminders to these customers via a website, an app or emails.

In one example, a customer purchases an item on a website hosted by the server 104, without providing any review of the purchased item. The server 104 may treat the customer as a candidate customer to be evaluated. In response to receiving a request from the server 104, the reviewer prediction computing device 102 may execute the one or more processors to select a subset of candidate customers who have purchased items under a concerned product type but have not provided any review for the purchased items, compute review probabilities that the customers will leave reviews for the items, and generate a ranked list of customers from the selected candidate customers based on the review probabilities, a budget and reviewer segmentation data. The reviewer prediction computing device 102 then transmits to the server 104 the ranked list of customers to be reminded for providing reviews.

In some embodiments, the reviewer prediction computing device 102 is further operable to communicate with the database 116 over the communication network 118. For example, the reviewer prediction computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the reviewer prediction computing device 102, in some examples, the database 116 can be a local storage device, such as a hard drive, a non-volatile memory, or a USB stick. The reviewer prediction computing device 102 may store online purchase data received from the server 104 in the database 116. The reviewer prediction computing device 102 may receive in-store purchase data and store related data from the store 109 and store them in the database 116. The reviewer prediction computing device 102 may also receive from the server 104 user session data identifying events associated with browsing sessions, and may store the user session data in the database 116. The reviewer prediction computing device 102 may also compute a potential reviewer list, and may store the potential reviewer list in the database 116.

In some examples, the reviewer prediction computing device 102 generates and/or updates different models (e.g., machine learning models, deep learning models, statistical models, algorithms, etc.) for predicting and motivating customers to provide item reviews. The reviewer prediction computing device 102 may generate training data for the models based on historical user session data, purchase data, customer features and review labels. The reviewer prediction computing device 102 trains the models based on their corresponding training data, and stores the models in a database, such as in the database 116 (e.g., a cloud storage). The models, when executed by the reviewer prediction computing device 102, allow the reviewer prediction computing device 102 to determine potential reviewers for nudging or reminding.

In some examples, the reviewer prediction computing device 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the reviewer prediction computing device 102 may generate a ranked list of customers to be reminded for providing reviews.

Figure 2:
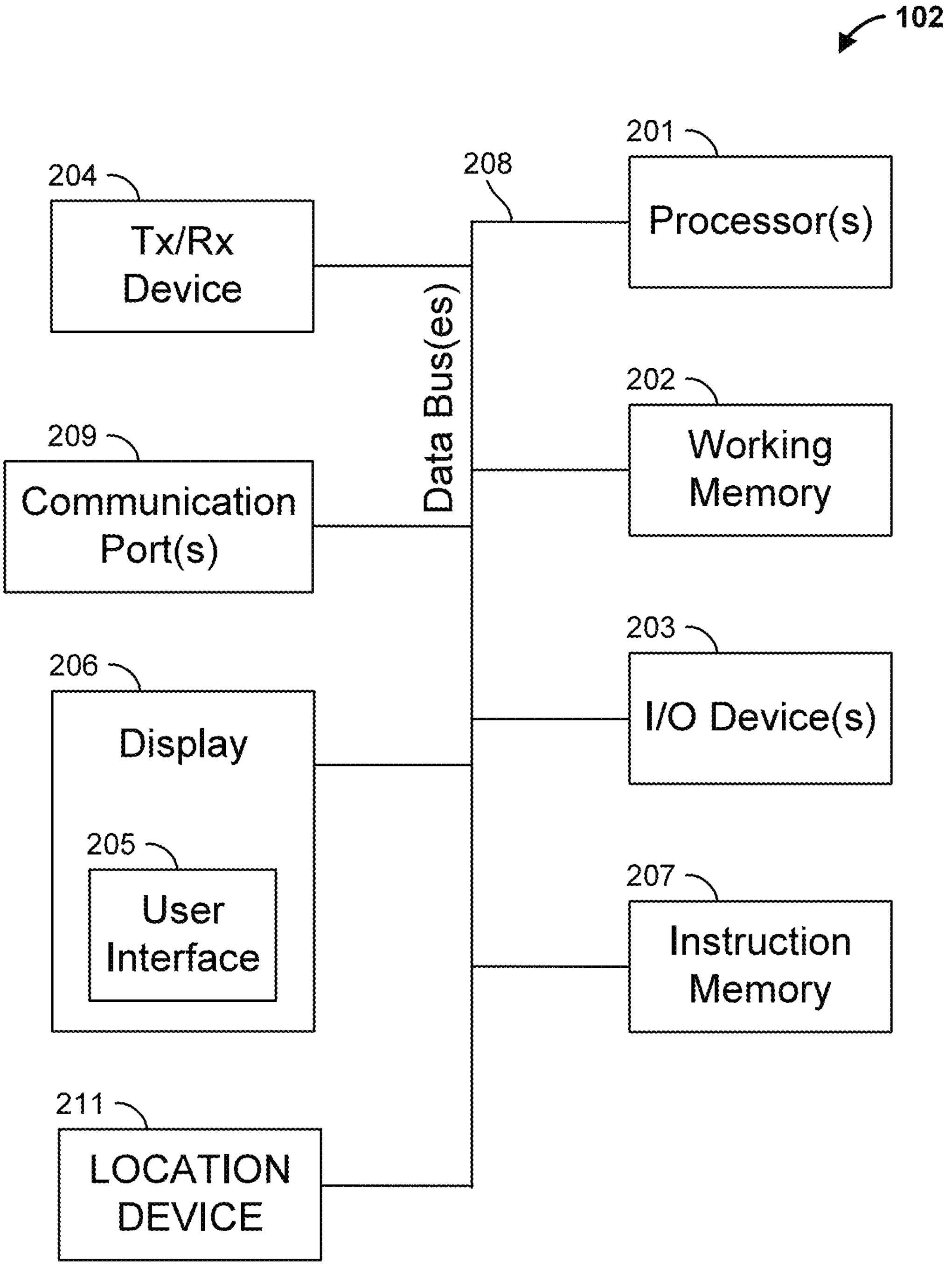
FIG. 2 is a block diagram of a reviewer prediction computing device, in accordance with some embodiments of the present teaching.

FIG. 2 illustrates a block diagram of a reviewer prediction computing device, e.g. the reviewer prediction computing device 102 of FIG. 1, in accordance with some embodiments of the present teaching. In some embodiments, each of the reviewer prediction computing device 102, the server 104, the workstation(s) 106, the multiple user computing devices 110, 112, 114, and the one or more processing devices 120 in FIG. 1 may include the features shown in FIG. 2. Although FIG. 2 is described with respect to certain components shown therein, it will be appreciated that the elements of the reviewer prediction computing device 102 can be combined, omitted, and/or replicated. In addition, it will be appreciated that additional elements other than those illustrated in FIG. 2 can be added to the reviewer prediction computing device 102.

As shown in FIG. 2, the reviewer prediction computing device 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 allow for communication among the various components. The data buses 208 can include wired, or wireless, communication channels.

The one or more processors 201 can include any processing circuitry operable to control operations of the reviewer prediction computing device 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the reviewer prediction computing device 102 can include a single memory unit configured to operate as both instruction memory and working memory. Further, although embodiments are discussed herein including non-volatile memory, it will be appreciated that the reviewer prediction computing device 102 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C #, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the reviewer prediction computing device 102 will be operating in. The one or more processors 201 are operable to receive data from, or send data to, a network, such as the communication network 118 of FIG. 1, via the transceiver 204.

The communication port(s) 209 may include any suitable hardware, software, and/or combination of hardware and software that is capable of coupling the reviewer prediction computing device 102 to one or more networks and/or additional devices. The communication port(s) 209 can be arranged to operate with any suitable technique for controlling information signals using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the reviewer prediction computing device 102 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1×RTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the reviewer prediction computing device 102 and/or the server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the reviewer prediction computing device 102 may determine a local geographical area (e.g., town, city, state, etc.) of its position.

In some embodiments, the reviewer prediction computing device 102 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
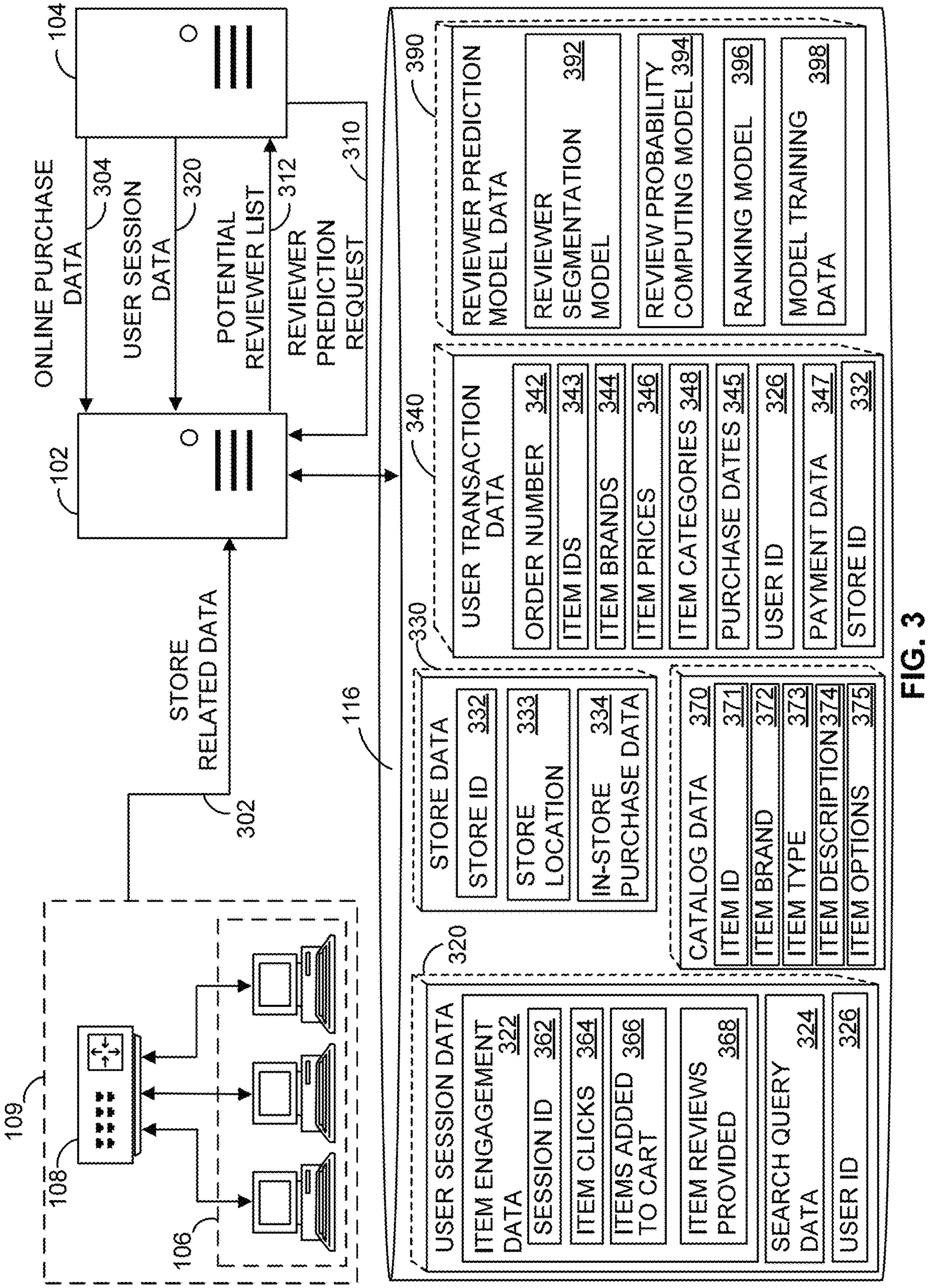
FIG. 3 is a block diagram illustrating various portions of a system for predicting and motivating customers to provide item reviews, in accordance with some embodiments of the present teaching.

FIG. 3 is a block diagram illustrating various portions of a system for predicting and motivating customers to provide item reviews, e.g. the system shown in the network environment 100 of FIG. 1, in accordance with some embodiments of the present teaching. As indicated in FIG. 3, the reviewer prediction computing device 102 may receive user session data 320 from the server 104, and store the user session data 320 in the database 116. The user session data 320 may identify, for each user (e.g., customer), data related to that user's browsing session, such as when browsing a retailer's webpage hosted by the server 104.

In some examples, the user session data 320 may include item engagement data 322, search query data 324, and user ID 326 (e.g., a customer ID, retailer website login ID, a cookie ID, etc.). The item engagement data 322 may include one or more of a session ID 362 (i.e., a website browsing session identifier), item clicks 364 identifying items which a user clicked (e.g., images of items for purchase, keywords to filter reviews for an item), items added-to-cart 366 identifying items added to the user's online shopping cart, and item reviews provided 368 identifying item reviews a user provided on the website. The search query data 324 may identify one or more searches conducted by a user during a browsing session (e.g., a current browsing session).

The reviewer prediction computing device 102 may also receive online purchase data 304 from the server 104, which identifies and characterizes one or more online purchases, such as purchases made by the user and other users via a retailer's website hosted by the server 104. The reviewer prediction computing device 102 may also receive store related data 302 from the store 109, which identifies and characterizes one or more in-store purchases. In some embodiments, the store related data 302 may also indicate other information about the store 109.

The reviewer prediction computing device 102 may parse the store related data 302 and the online purchase data 304 to generate user transaction data 340. In this example, the user transaction data 340 may include, for each purchase, one or more of: an order number 342 identifying a purchase order, item IDs 343 identifying one or more items purchased in the purchase order, item brands 344 identifying a brand for each item purchased, item prices 346 identifying the price of each item purchased, item categories 348 identifying a product type (or category) of each item purchased, purchase dates 345 identifying the purchase dates of the purchase orders, a user ID 326 for the user making the corresponding purchase, payment data 347 indicating payment methods and related information (e.g. emails associated with payment) for corresponding online orders, and store ID 332 for the corresponding in-store purchase, or for the pickup store or shipping-from store associated with the corresponding online purchase.

In some embodiments, the database 116 may parse the store related data 302 to generate store data 330. In this example, the store data 330 may include, for each store, one or more of: a store ID 332 of the store, a store location 333 of the store, and in-store purchase data 334 of the store.

In some embodiments, the database 116 may further store catalog data 370, which may identify one or more attributes of a plurality of items, such as a portion of or all items a retailer carries in stores and/or at e-commerce platforms. The catalog data 370 may identify, for each of the plurality of items, an item ID 371 (e.g., an SKU number), item brand 372, item type 373 (e.g., grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store reviewer prediction model data 390 identifying and characterizing one or more models and related data for predicting and motivating customers to provide item reviews. For example, the reviewer prediction model data 390 may include: a reviewer segmentation model 392, a review probability computing model 394, a ranking model 396, and model training data 398.

The reviewer segmentation model 392 may be used to divide customers of a retailer into different segments based on some metrics related to product review. In some embodiments, the reviewer segmentation model 392 utilizes two metrics: review frequency and review recency, at the same time. The review frequency indicates how many reviews a customer provided per order during a past time period, e.g. the last year. The review recency indicates a time period or days passed since the last review provided by a customer. Customers of a retailer can be assigned, using the reviewer segmentation model 392, to different buckets based on their review frequencies and review recencies after normalization. Each bucket corresponds to a segment of customers or reviewers with shared features. These shared features will be learned and utilized by machine learning to compute review probability and rank potential reviewers.

The review probability computing model 394 may be used to compute review probabilities based on feature data related to customers and transactions. In some embodiments, the review probability computing model 394 includes a neural network configured to predict a review probability that a customer will provide a review for an item in a product type. For example, the neural network may take input features related to: the customer, the customer's interaction with a retailer website or retailer app, transactions performed by the customer, and previous reviews given by the customer. In some embodiments, the neural network is a multi-task neural network configured to predict multiple review probabilities each being a probability that the customer will provide a review for an item in a respective product type.

The ranking model 396 may be used to rank potential reviewers based on the reviewer segmentation data and the review probabilities, which are computed based on the reviewer segmentation model 392 and the review probability computing model 394, respectively. In some examples, the ranking model 396 also considers a budget, e.g. predetermined based on business requirement, to rank the potential reviewers. For example, given a reviewer segment and review probabilities for candidate reviewers (or customers) in the reviewer segment, the ranking model 396 may be used to generate a ranked list of customers in the reviewer segment, without breaking the budget requirement. This ranked list of customers includes potential reviewers ranked according to their likelihood of leaving reviews in a given product type.

The model training data 398 may include training data utilized for training one or more of the reviewer segmentation model 392, the review probability computing model 394 and the ranking model 396. In some examples, the model training data 398 may include, but not limited to, data related to a plurality of customers, their historical transaction data, their historical user session data, and review label data. The review label data may be determined based on historical reviews provided by the plurality of customers. For example, given a product type, a customer who has provided a review in this product type is labelled +1, and a customer who has not provided any review in this product type is labelled −1. In some examples, the model training data 398 may be used to train a machine learning model to optimize an objective function based on optimized hyperparameters. The optimized hyperparameters can enable a first ranking of potential reviewers generated by the machine learning model during a test stage to be closest to a second ranking of the potential reviewers based on the review label data. In the second ranking, a customer having a larger label value is ranked higher than a customer having a smaller label value.

In some examples, the reviewer prediction computing device 102 receives a reviewer prediction request 310 from the server 104. The reviewer prediction request 310 may be associated with one or more product types, or one or more product categories. In some embodiments, the reviewer prediction computing device 102 may determine a plurality of customers who have purchased items in an associated product type but have not provided any review for the purchased items. Based on feature data related to the plurality of customers and transactions involving the purchased items, the reviewer prediction computing device 102 may compute, using at least one machine learning model, review probabilities each being a probability of a corresponding customer providing a review in the associated product type. The at least one machine learning model may include any model in the reviewer prediction model data 390. Among or from the plurality of customers, a potential reviewer list 312 including ranked customers or potential reviewers is generated by the reviewer prediction computing device 102 based on the review probabilities, budget data and reviewer segmentation data. In response to the reviewer prediction request 310, the reviewer prediction computing device 102 transmits the potential reviewer list 312 to the server 104.

In some embodiments, the reviewer prediction computing device 102 may assign one or more of the above described operations to a different processing unit or virtual machine hosted by one or more processing devices 120. Further, the reviewer prediction computing device 102 may obtain the outputs of the these assigned operations from the processing units, and generate the ranked potential reviewers based on the outputs.

Figure 4:
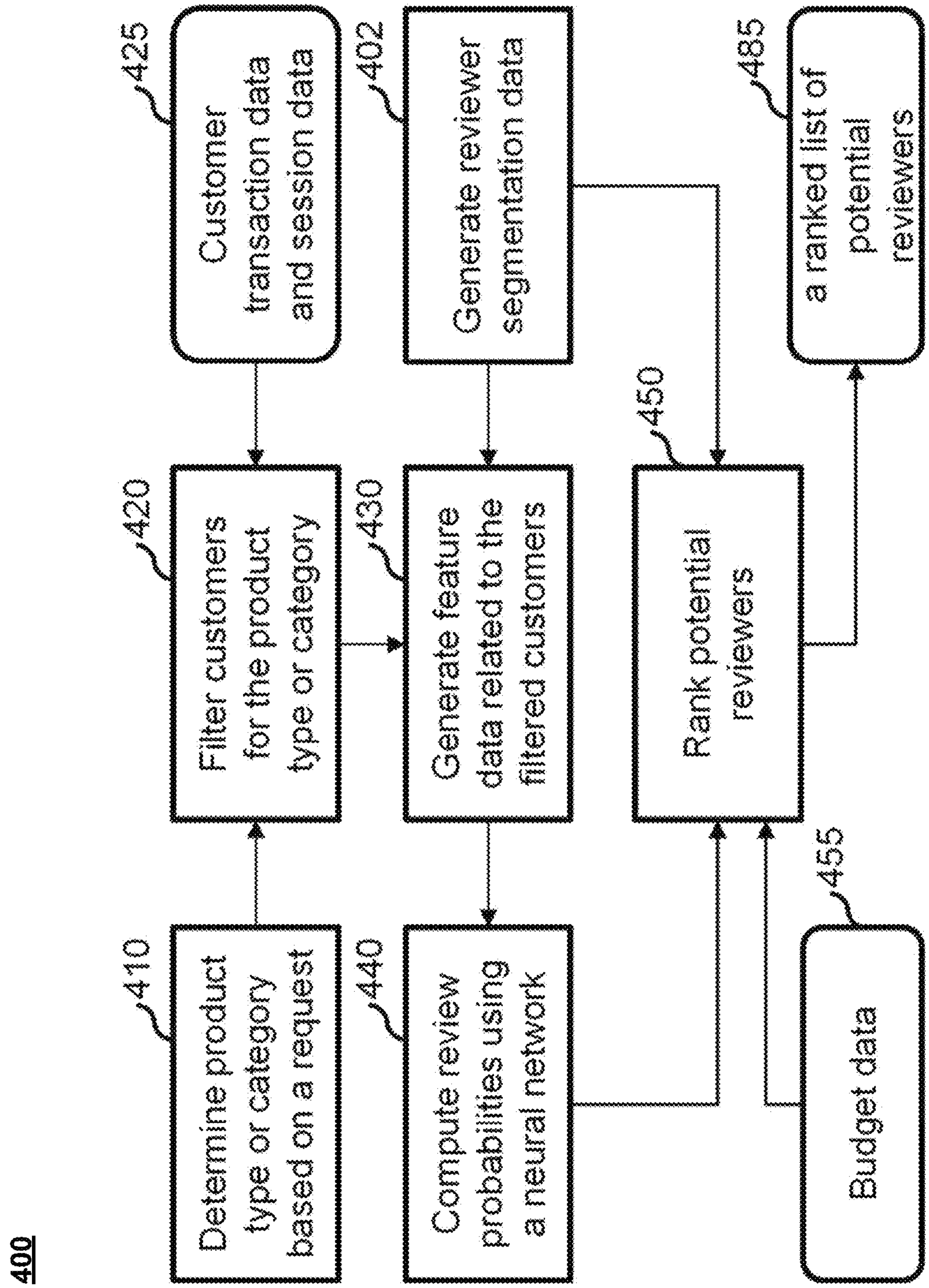
FIG. 4 illustrates an exemplary process for generating a list of potential reviewers, in accordance with some embodiments of the present teaching.

FIG. 4 illustrates an exemplary process 400 for generating a list of potential reviewers, in accordance with some embodiments of the present teaching. In some embodiments, the process 400 can be carried out by one or more computing devices, such as the reviewer prediction computing device 102 and/or the cloud-based engine 121 of FIG. 1.

As shown in FIG. 4, the process 400 starts from operation 410, where a product type (or category) is determined based on a request, e.g. the reviewer prediction request 310 in FIG. 3. The product type (or category) is sent to operation 420 for filtering customers. In some embodiments, the process 400 can handle multiple product types at the same time. In various embodiments, the product type can be replaced by a product category, a product family, a product group, or any other granularity of products. For simplicity, the following descriptions will use product type as an exemplary granularity.

At the operation 420, customers of a retailer are filtered based on the product type. In this example, customer transaction data and session data 425 are obtained and utilized to filter the customers. For example, at the operation 420, a subset of the entire customers of the retailer is selected as candidate customers (or candidate reviewers) who have purchased items in the product type but have not provided any review for the purchased items yet. This selection may be based on the customer transaction data and session data 425 of customers of the retailer. The selected list of candidate customers may be sent to operation 430 for feature generation.

At the operation 430, feature data related to the selected list of candidate customers is generated. In some embodiments, the feature data includes but not limited to: customer features, customer action features, benefit affinity data, transaction segment data, and reviewer segment data. In some examples, the customer features include features about: retailer membership, purchase history, demographic data and persona of each customer. In some examples, the customer action features include interaction features like click, add-to-cart, impression, etc. of each customer. In some examples, the benefit affinity data includes data about transaction related benefits likely to be used by each customer. The transaction related benefits may include benefits like free shipping or free delivery from store. The benefit affinity data may indicate a tendency of each customer to use these benefits. In some examples, the transaction segment data indicates a transaction-based segment each customer belongs to. A transaction-based segment for a customer may be determined based on monetary and payment information of the customer's past transactions weighted according to transaction frequency and recency of the customer. In some examples, the reviewer segment data indicates a reviewer segment each customer belongs to.

In some embodiments, the reviewer segment data is generated at operation 402, which can be performed offline before the request is received or in real-time after the request is received. In some embodiments, the operation 402 is performed based on the reviewer segmentation model 392 in FIG. 3. An exemplary detailed process for the operation 402 is shown in FIG. 5.

Figure 5:
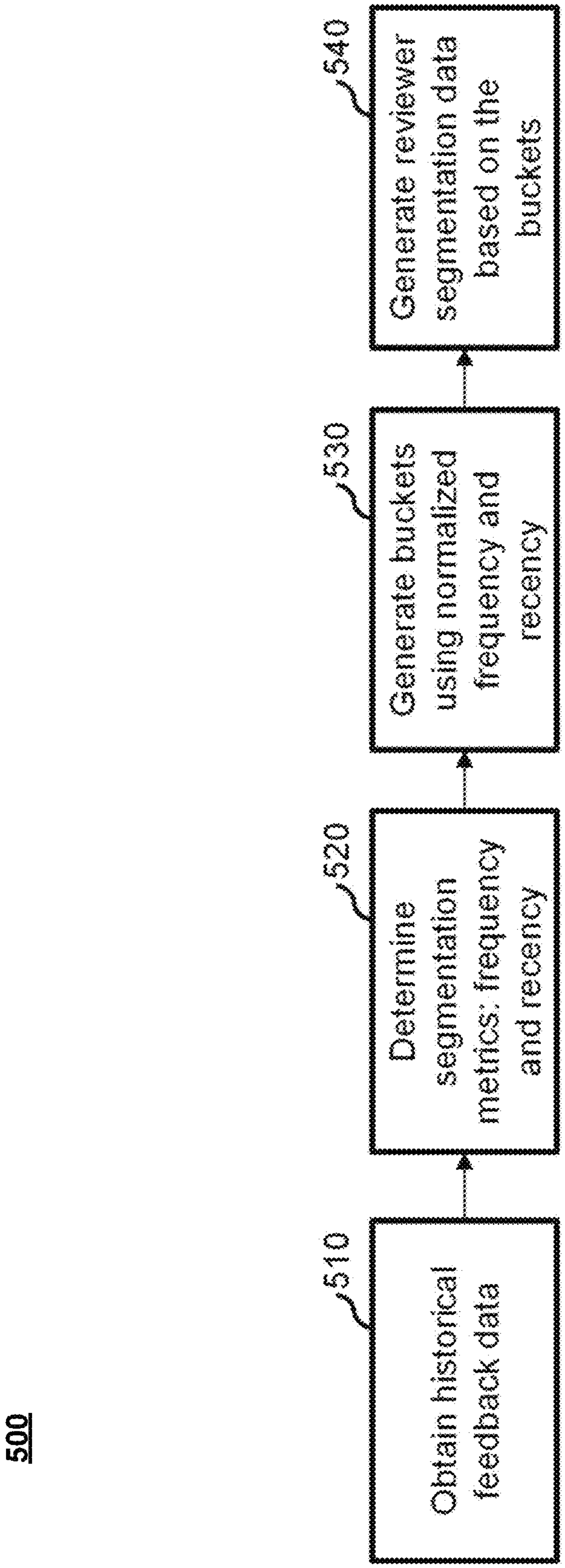
FIG. 5 illustrates an exemplary process for generating reviewer segmentation data, in accordance with some embodiments of the present teaching.

FIG. 5 illustrates an exemplary process 500 for generating reviewer segmentation data, in accordance with some embodiments of the present teaching. In some embodiments, the process 500 can be carried out by one or more computing devices, such as the reviewer prediction computing device 102 and/or the cloud-based engine 121 of FIG. 1. In some embodiments, the process 500 is a detailed process of the operation 402 in FIG. 4.

As shown in FIG. 5, the process 500 starts from operation 510, where historical feedback data or review data are obtained for customers of a retailer. In some embodiments, the review data are collected at the operation 510 for a past time period, e.g. the past one year or two years.

As shown in FIG. 5, the historical review data is provided to operation 520, where segmentation metrics are determined based on the historical review data. In some examples, two segmentation metrics are determined: review frequency and review recency. The review frequency of a customer indicates how many reviews the customer provided per order during a past time period, e.g. the last year. The review recency of a customer indicates a time period or days passed since the last review provided by the customer.

At operation 530, the review frequency and review recency of the historical review data are normalized to generate different buckets. The buckets of the review frequency and review recency may be utilized at the same time to generate reviewer segmentation data at operation 540. The reviewer segmentation data may include a plurality of reviewer segments, each of which corresponds to one or more buckets generated at the operation 530.

Figure 6:
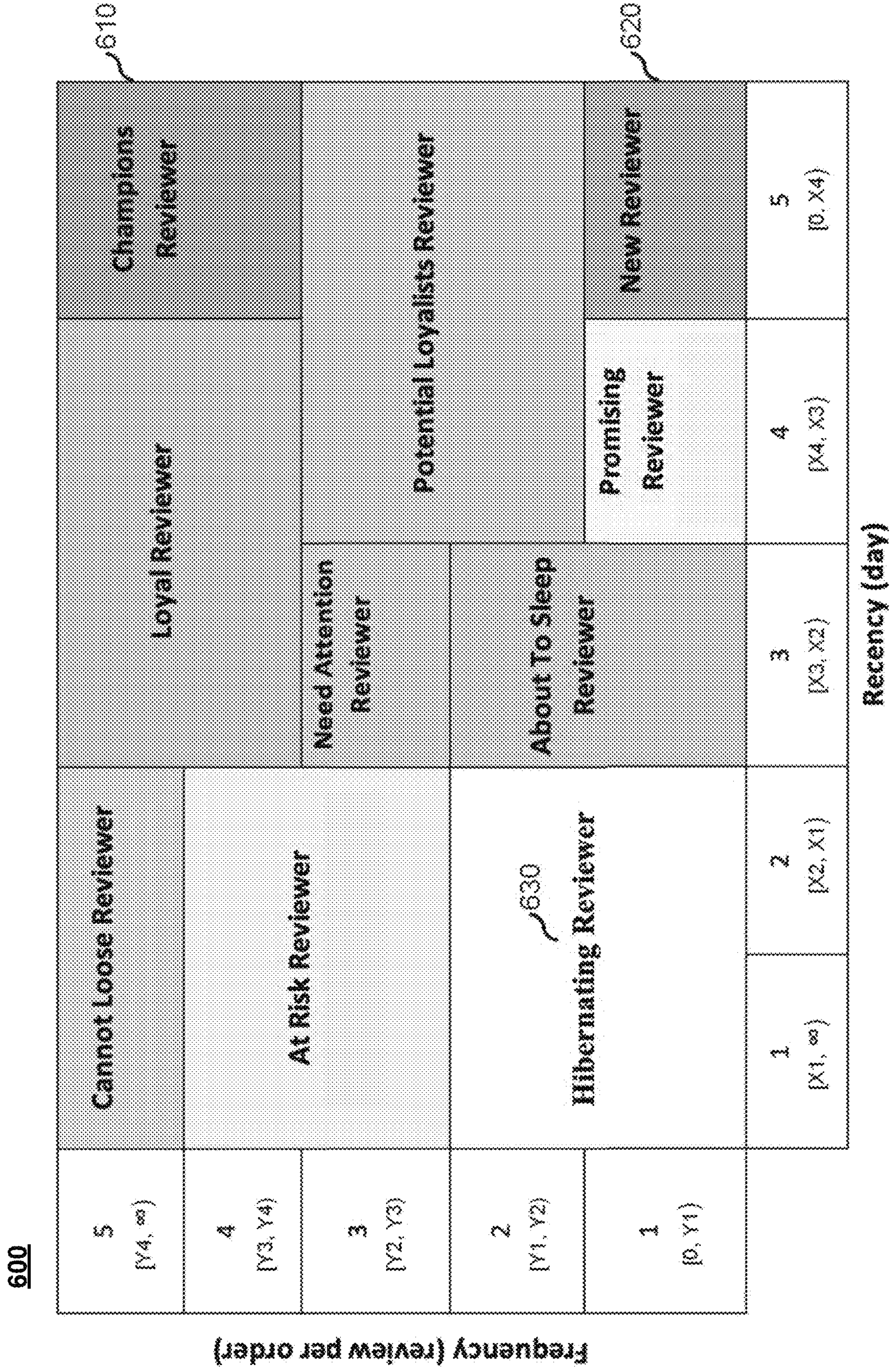
FIG. 6 illustrates an exemplary reviewer segmentation result, in accordance with some embodiments of the present teaching.

FIG. 6 illustrates an exemplary reviewer segmentation result 600, in accordance with some embodiments of the present teaching. In some embodiments, the reviewer segmentation result 600 is a result generated by the process 500 in FIG. 5. As shown in FIG. 6, the reviewer segmentation result 600 includes review recency buckets 1~5 on the X axis, and review frequency buckets 1~5 on the Y axis. In the example shown in FIG. 6, the range numbers associated with each recency bucket represent a range of days passed since the last review of a customer; the range numbers associated with each frequency bucket represent a range of "review per order" for a customer.

In some embodiments, the exact numbers or values of these ranges can vary and be optimized based on historical review data across different shopping seasons or events. For example, during a Black Friday shopping season, the number of orders placed by customers increases dramatically compared to other seasons. As such, the review frequency values tend to be reduced for all customers during the Black Friday shopping season. To keep a relatively even distribution of customers into the buckets of the review frequency, either a larger number of review frequency buckets or a redetermination of values of bucket ranges can be applied.

In the example shown in FIG. 6, there are 5 review recency buckets and 5 review frequency buckets. As such, there are in total 25 recency-frequency segments. But since a reviewer segment may occupy one or more recency-frequency segments, the reviewer segmentation result 600 in this example includes in total 10 reviewer segments: cannot lose reviewer, loyal reviewer, champions reviewer, at risk reviewer, need attention reviewer, potential loyalists reviewer, hibernating reviewer, about to sleep reviewer, promising reviewer, and new reviewer.

In one example, if a customer provided the last review within the past X4 days (within the recency bucket 5) and provided on average more than Y3 review(s) per order (within the frequency buckets 4 and 5) during the last year, the customer is assigned to the champions reviewer segment 610 and treated as a champions reviewer who frequently provided item reviews till now.

In another example, if a customer provided the last review within the past X4 days (within the recency bucket 5) but provided on average less than Y1 review(s) per order (within the frequency bucket 1) during the last year, the customer is assigned to the new reviewer segment 620 and treated as a new reviewer who seldom provided item reviews before and just started to provide item review.

In yet another example, if a customer provided the last review more than X2 days ago (within the recency buckets 1 and 2) and provided on average less than Y2 review(s) per order (within the frequency buckets 1 and 2) during the last year, the customer is assigned to the hibernating reviewer segment 630 and treated as a hibernating reviewer who seldom provided item reviews before and has not provided item reviews for a long time.

In some embodiments, the reviewer segmentation result 600 may be generated by the process 500 in FIG. 5 or the operation 402 in FIG. 4, as reviewer segmentation data. Referring back to FIG. 4, the reviewer segmentation data generated at the operation 402 can be utilized by the operation 430 for generating feature data and by operation 450 for ranking potential reviewers.

As discussed above, the feature data generated at the operation 430 is related to the selected list of candidate customers and transactions involving the purchased items of the candidate customers. At operation 440, review probabilities are computed based on the feature data, e.g. using a neural network. In some embodiments, the neural network is a multi-task neural network having a structure shown in FIG. 7. In some embodiments, the operation 440 is performed based on the review probability computing model 394 in FIG. 3. In some embodiments, a multi-task neural network is better than a multi-class classification model for the operation 440, because one customer can provide reviews for multiple product types.

Figure 7:
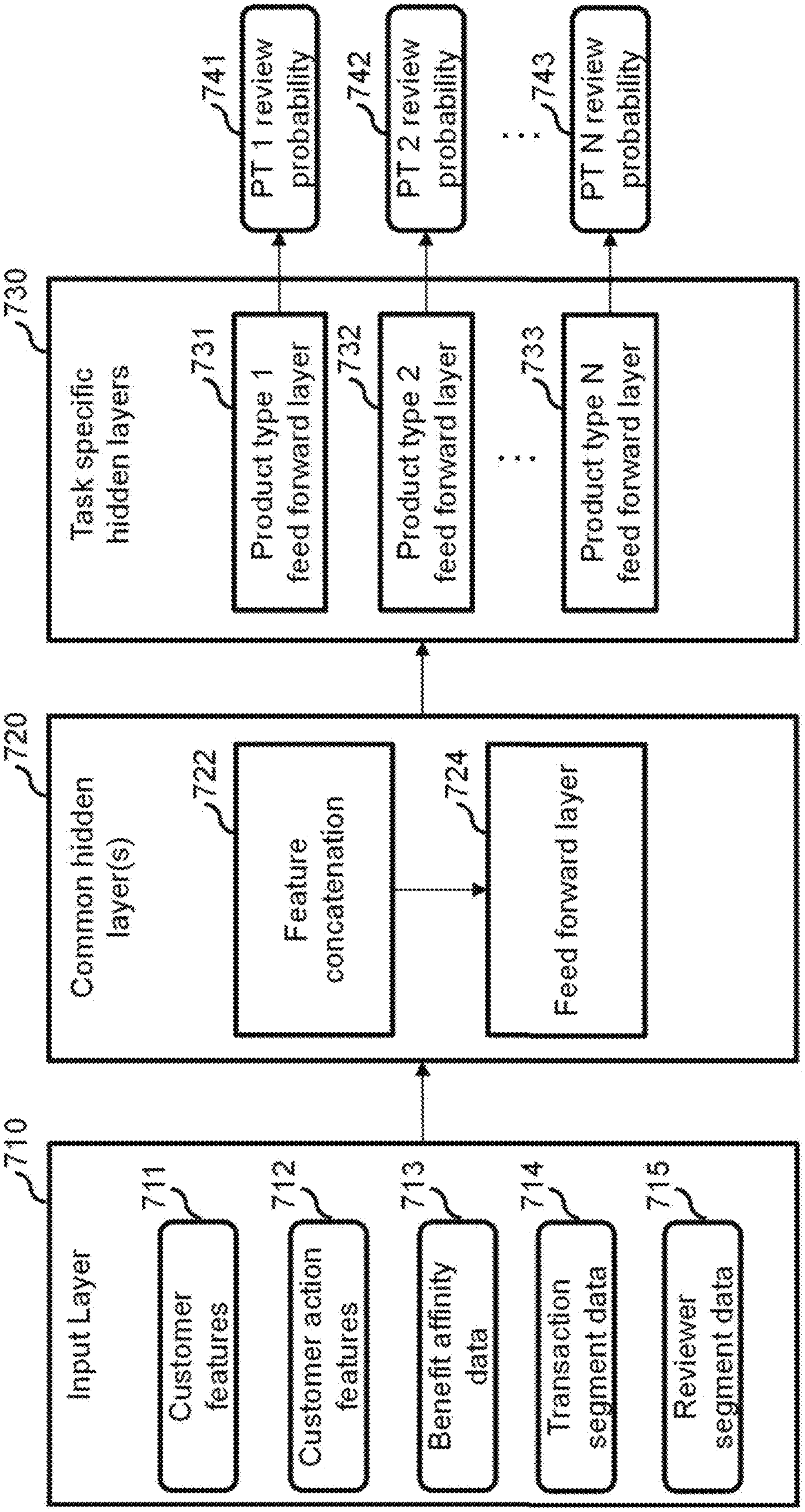
FIG. 7 illustrates an exemplary structure of a multi-task neural network for computing review probabilities, in accordance with some embodiments of the present teaching.

FIG. 7 illustrates an exemplary structure of a multi-task neural network 700 for computing review probabilities, in accordance with some embodiments of the present teaching. In some embodiments, the multi-task neural network 700 is operated by one or more computing devices, such as the reviewer prediction computing device 102 and/or the cloud-based engine 121 of FIG. 1. In some embodiments, the multi-task neural network 700 can be implemented as the neural network used at the operation 440 in FIG. 4.

As shown in FIG. 7, the multi-task neural network 700 includes an input layer 710, one or more common hidden layer(s) 720 and a plurality of task specific hidden layers 730. The input layer 710 in this example includes various input features to be fed into a serving layer, e.g. the common hidden layer(s) 720. As shown in FIG. 7, the input layer 710 includes: customer features 711, customer action features 712, benefit affinity data 713, transaction segment data 714, and reviewer segment data 715. During a training stage of the multi-task neural network 700, the features in the input layer 710 are features related to a training group of customers with known historical review data. During a real-time inference stage of the multi-task neural network 700, the features in the input layer 710 are features related to a selected group of customers whose review probabilities are to be predicted.

In some examples, the customer features 711 include features about: retailer membership, purchase history, demographic data and persona of each customer (in the training group during training or in the selected group during inference). In some examples, the customer action features 712 include interaction features like click, add-to-cart, impression, etc. of each customer. In some examples, the benefit affinity data 713 includes data about transaction related benefits likely to be used by each customer. In some examples, the transaction segment data 714 indicates a transaction-based segment each customer belongs to. A transaction-based segment for a customer may be determined based on monetary and payment information of the customer's past transactions weighted according to transaction frequency and recency of the customer. In some examples, the reviewer segment data 715 indicates a reviewer segment each customer belongs to. The reviewer segments may be predetermined based on the process 500 in FIG. 5 and/or as shown in the reviewer segmentation result 600 in FIG. 6. In some embodiments, the input layer 710 may also include other features, e.g. features related to shopping seasons or holidays. For example, during a Halloween or Christmas shopping season, nudging customers who purchased home decoration products may be more efficient than nudging customer who purchased other product types.

The common hidden layer(s) 720 in FIG. 7 includes: a feature concatenation module 722 and a feed forward layer 724. The feature concatenation module 722 in this example concatenates features from the input layer 710 to generate concatenated features. The feed forward layer 724 in this example may include multiple layers that can fit the concatenated features for each customer and convert them into one multi-dimensional vector for the customer.

In some embodiments, the output of the feed forward layer 724 is the input to all of the plurality of task specific hidden layers 730, each of which corresponds to a specific task for a respective product type. In this example, each task of N tasks is performed by a specific fully connected neural network in a corresponding feed forward layer to predict review probability more accurately for a respective product type. As shown in FIG. 7, the plurality of task specific hidden layers 730 include N feed forward layers: a product type 1 (PT 1) feed forward layer 731 configured to compute a PT 1 review probability 741 for each customer, a product type 2 (PT 2) feed forward layer 732 configured to compute a PT 2 review probability 742 for each customer . . . a product type N (PT N) feed forward layer 733 configured to compute a PT N review probability 743 for each customer. The number of tasks here is the same as the number of product types being processed simultaneously by the multi-task neural network 700.

In some embodiments, the labels in the training data are generated based on historical behavior of the customers. For example, a customer who has purchased three items can be labelled as [1, 1, 0], if the customer provided reviews for the first two items, but did not provide a review for the third item. During the training stage, for each customer, the system can compute an error based on the predicted response of the multi-task neural network 700 and the labels of real review data. The error can be back propagated to the multi-task neural network 700 to update the network parameters iteratively until the error is smaller than a predetermined threshold.

In some embodiments, the common hidden layer(s) 720 is trained based on the error prediction and backpropagation across all product types. At each task specific hidden layer, the system adjusts the model parameters based on the error prediction of the specific task. In some examples, the error prediction and backpropagation is performed and shared by the common hidden layer(s) 720 and the plurality of task specific hidden layers 730. In some embodiments, the multi-task neural network 700 is re-trained weekly with updated reviewer segments and other updated training data.

In some embodiments, the multi-task neural network 700 can be used to find out which features in the input layer 710 are important or give a big contribution to the review probabilities. These important features can be used to generate insight data for making business decisions related to customer review and engagement.

In some embodiments, the review probabilities 741, 742, 743 are generated simultaneously by the multi-task neural network 700 for different product types, and may be the review probabilities computed at the operation 440 in FIG. 4. Referring back to FIG. 4, the review probabilities are provided to operation 450, to rank potential reviewers and generate a ranked list of potential reviewers 485. In some embodiments, the operation 450 is performed based on the ranking model 396 in FIG. 3.

As shown in FIG. 4, the potential reviewers are ranked at the operation 450 based on: the reviewer segmentation data generated at the operation 402, the review probabilities computed at the operation 440, and some budget data 455. In some examples, the budget data 455 includes a budget predetermined based business requirement. In some embodiments, a quantity B of top customers to nudge can be determined based on the budget. In some embodiments, based on the budget, the system can also determine a maximum number of nudges to send to each customer and/or during each month.

In some examples, the review probabilities are used to sort and rank the customers according to their predicted probabilities of writing or providing the reviews, given a product type. The most probable customers or the top B ranked customers, among a plurality of candidate customers, may be selected to generate the ranked list of potential reviewers 485 for the given product type.

In some embodiments, multiple ranked lists of potential reviewers 485 are generated by the process 400 at the same time for multiple product types, respectively. In some examples, the review probabilities computed at the operation 440 are provided in form of a table of customers with their review probabilities for each product type. The system operates the ranking model for all product types or some specific product types based on the request.

In some examples, the reviewer segmentation data can be utilized at the operation 450 as a selection strategy. For example, based on a predetermined instruction for picking the champion reviewers, or picking potential reviewers having review probabilities higher than a threshold, a selection strategy may be determined at the operation 450 to select these types of reviewers first. Then these reviewers are sorted and ranked based on their respective review probabilities, and the top B potential candidates may be selected for nudging based on the budget, to generate the ranked list of potential reviewers 485.

In some examples, a general instruction is received for exploration of new customers to nudge, to motivate them to write reviews in hope that they will become champions reviews later. Based on this instruction, the ranking at the operation 450 may give priority to new reviewer segment, promising reviewer segment and/or about to sleep reviewer segment (as shown in FIG. 6), and rank the customers falling into these segments to generate top reviewer candidates to form the ranked list of potential reviewers 485.

In some examples, a general instruction is received for exploitation to increase the total number of reviews. Based on this instruction, the ranking at the operation 450 may give priority to champions reviewer segment, loyal reviewer segment and/or potential loyalists reviewer segment (as shown in FIG. 6), and rank the customers falling into these segments to generate top reviewer candidates to form the ranked list of potential reviewers 485.

In some examples, a selection strategy is determined at the operation 450 to select across all reviewer segments. In some examples, a selection strategy is determined at the operation 450 to select one or more of the reviewer segments.

Figure 8:
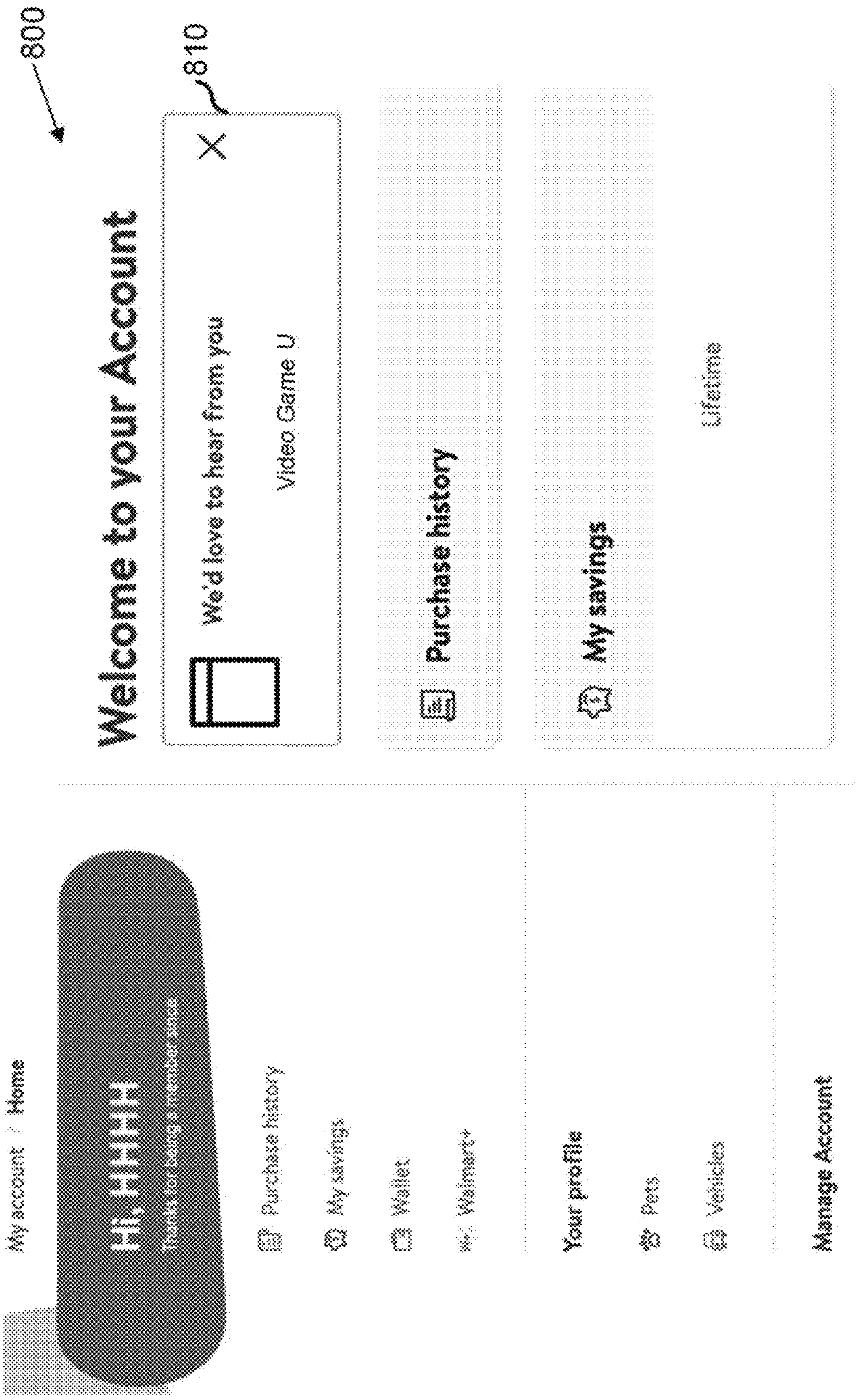
FIG. 8 illustrates an exemplary user interface via a website for reminding a customer to provide item review, in accordance with some embodiments of the present teaching.

FIG. 8 illustrates an exemplary user interface via a website 800 for reminding a customer to provide item review, in accordance with some embodiments of the present teaching. As shown in FIG. 8, a nudge or review reminder 810 is provided on the website 800 to a customer, to motivate the customer to provide a review of a video game purchased by the customer. The nudge 810 in this example is located on top of other sections like purchase history, my savings, etc., in an account webpage of the customer.

Figure 9:
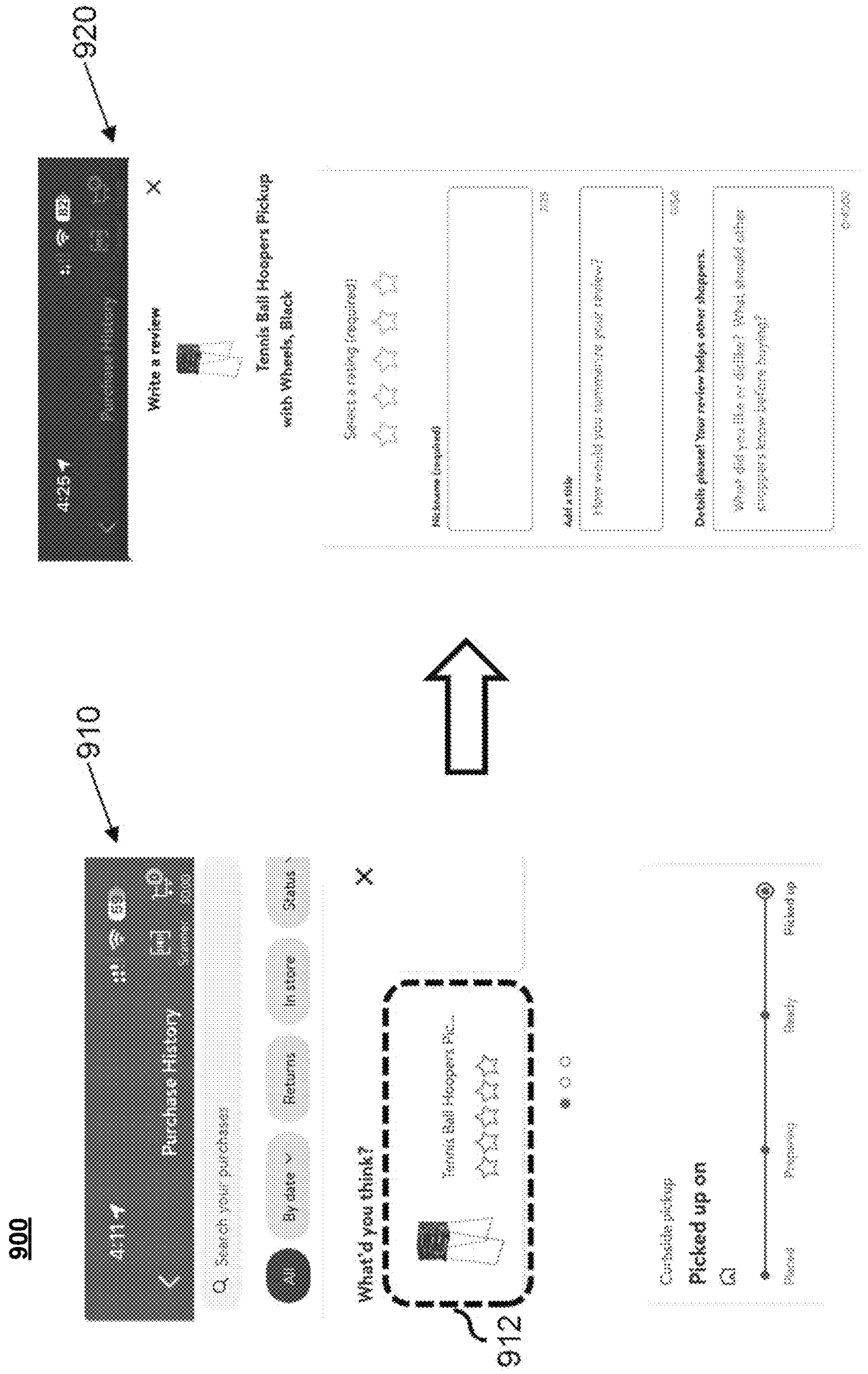
FIG. 9 illustrates exemplary user interfaces via an app for reminding a customer to provide item review, in accordance with some embodiments of the present teaching.

FIG. 9 illustrates exemplary user interfaces via an app 900 for reminding a customer to provide item review, in accordance with some embodiments of the present teaching. As shown in FIG. 9, a nudge or review reminder 912 is provided on a user interface 910 of the app to a customer, to motivate the customer to provide a review of a tennis ball hopper purchased by the customer. The nudge 912 in this example is located on top of other sections like a pick up timeline in a purchase history webpage of the customer on the user interface 910. Upon the customer's selection of or click on the nudge 912, a user interface 920 of the app is shown to the customer for filling out review information (e.g. rating, reviewer nickname, review title, review details, etc.) of the tennis ball hopper.

Figure 10:
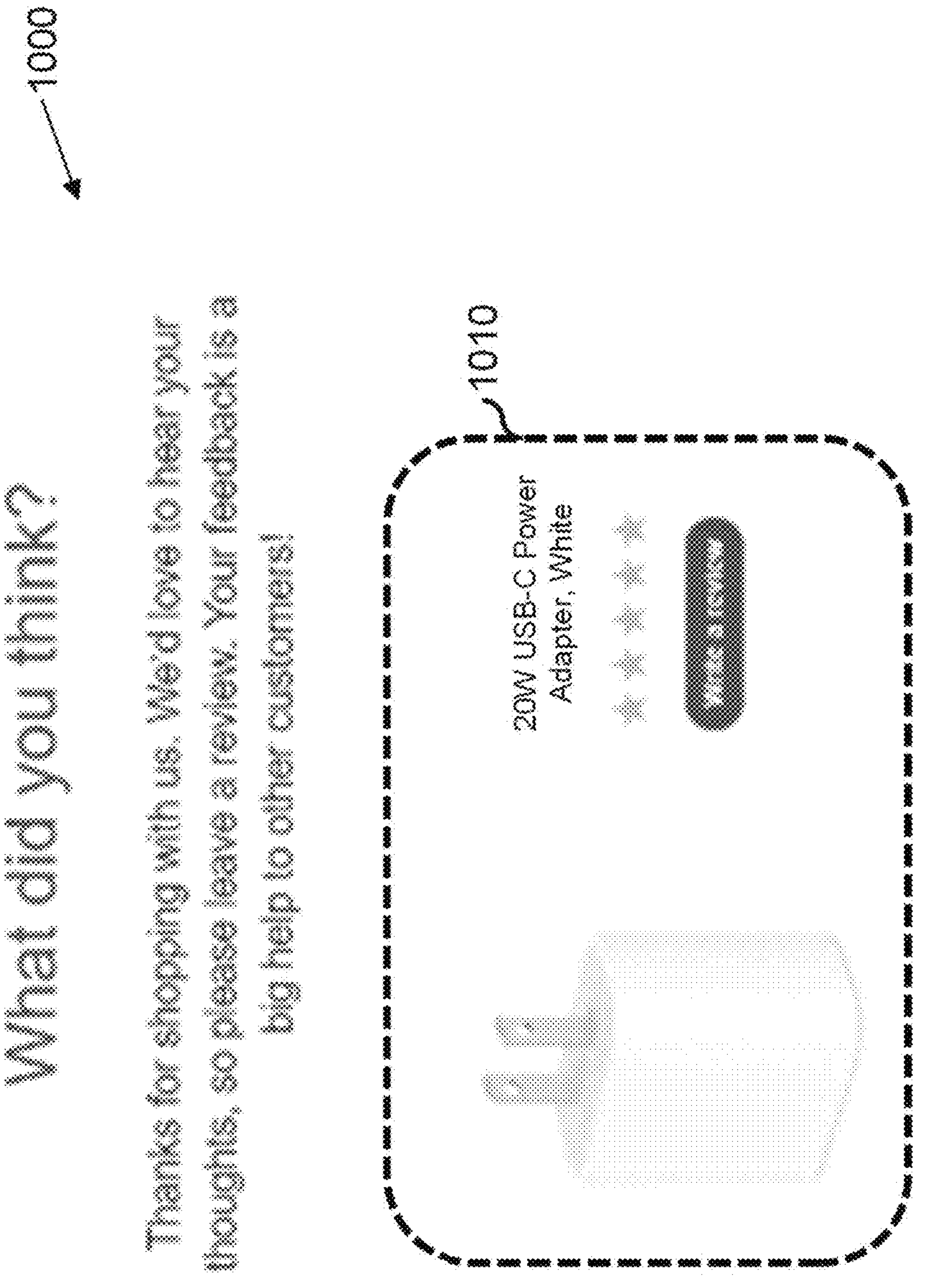
FIG. 10 illustrates an exemplary user interface via an email for reminding a customer to provide item review, in accordance with some embodiments of the present teaching.

FIG. 10 illustrates an exemplary user interface via an email 1000 for reminding a customer to provide item review, in accordance with some embodiments of the present teaching. As shown in FIG. 10, a nudge or review reminder 1010 is provided in the email 1000 to a customer, to motivate the customer to provide a review of a power adapter purchased by the customer. The nudge 1010 in this example is located right below the email content.

As such, after determining a customer to be in a potential reviewer list, e.g. the potential reviewer list 312 or the ranked list of potential reviewers 485, the system can nudge the customer in various manners with different nudging locations in the user interface, within a nudging time period from the customer's purchase. In some embodiments, the nudging manners, the nudging locations and/or the nudging time period may be part of the model parameters to be optimized during training of the machine learning model(s) used to generate the potential reviewer list. In some embodiments, the potential reviewer list generated based on the methods and systems disclosed above can automatically trigger nudge notification transmissions to the customers in the potential reviewer list.

Figure 11:
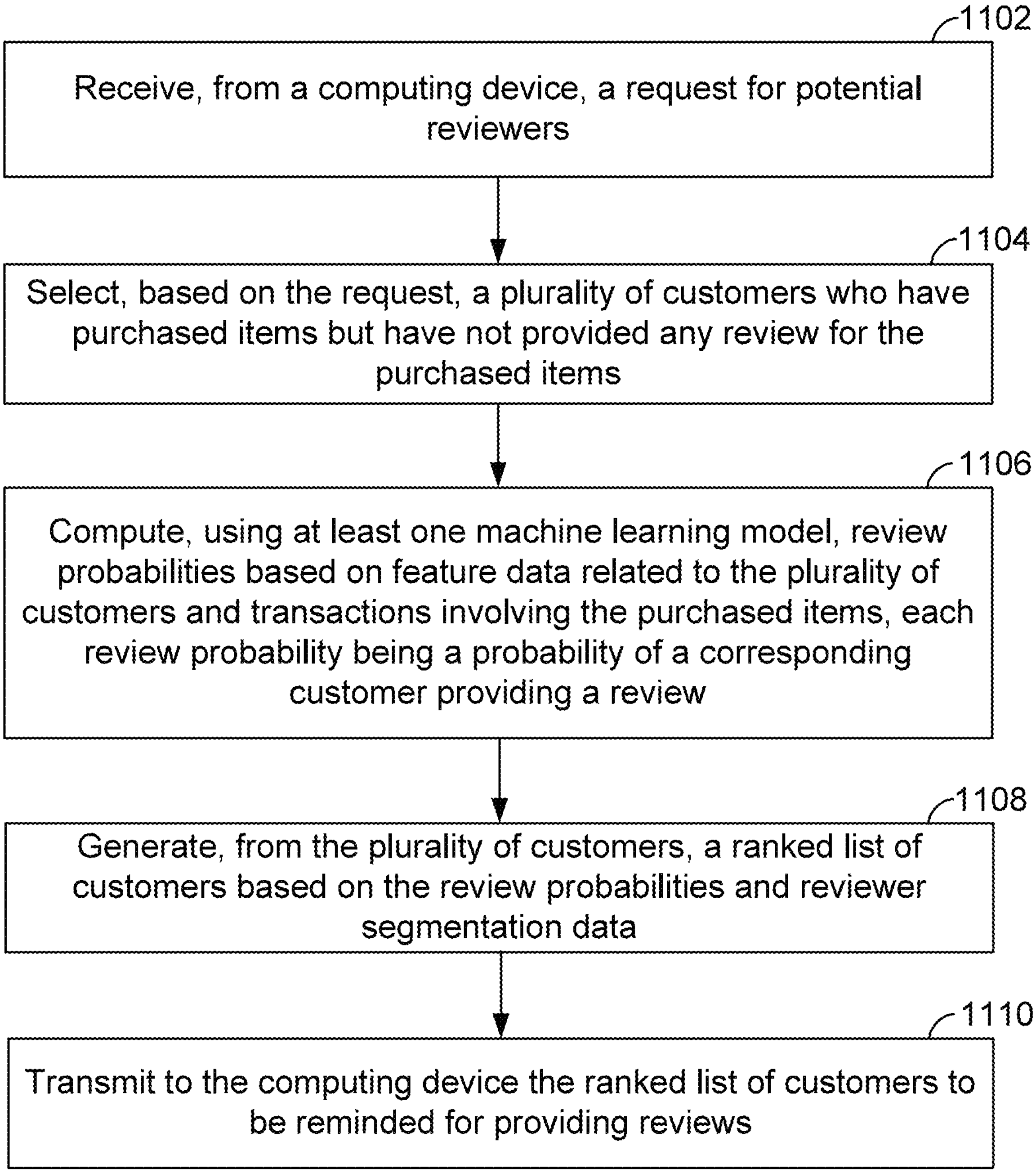
FIG. 11 is a flowchart illustrating an exemplary method for predicting and motivating customers to provide item reviews, in accordance with some embodiments of the present teaching.

FIG. 11 is a flowchart illustrating an exemplary method 1100 for predicting and motivating customers to provide item reviews, in accordance with some embodiments of the present teaching. In some embodiments, the method 1100 can be carried out by one or more computing devices, such as the reviewer prediction computing device 102 and/or the cloud-based engine 121 of FIG. 1. Beginning at operation 1102, a reviewer prediction request for predicting potential reviewers is received from a computing device. At operation 1104, a plurality of customers who have purchased items but have not provided any review for the purchased items are selected based on the reviewer prediction request. At operation 1106, review probabilities are computed using at least one machine learning model based on feature data related to the plurality of customers and transactions involving the purchased items. Each review probability is a probability of a corresponding customer providing a review. At operation 1108, a ranked list of customers is generated from the plurality of customers based on the review probabilities and reviewer segmentation data. At operation 1110, the ranked list of customers is transmitted to the computing device to be reminded for providing reviews.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
a processor; and
a non-transitory memory storing instructions, that when executed, cause the processor to:
receive a request for potential reviewers,
select, based on the request, a plurality of customers who have purchased items but have not provided any review for the purchased items,
compute, using at least one machine learning model, review probabilities based on feature data related to the plurality of customers and transactions involving the purchased items, wherein each review probability is a review probability of a corresponding customer providing a review for a respective product type, wherein the at least one machine learning model comprises a multi-task neural-network including:
an input layer configured to receive the feature data;
a feature concatenation layer configured to concatenate features of the feature data to generate concatenated features;
a feed forward layer configured to fit the concatenated features and convert them into a multi-dimensional vector for each of the plurality of customers; and
a plurality of task specific hidden layers each of which corresponds to a respective task for the respective product type, wherein each respective task is performed by a respective fully connected neural network in a corresponding feed forward layer to predict the review probability for the respective product type,
generate, from the plurality of customers, a ranked list of customers based on the review probabilities and reviewer segmentation data, and
transmit to a computing device the ranked list of customers to be reminded for providing reviews.

2. The system of claim 1, wherein the plurality of customers are selected based on:
determining, based on the request, at least one product type; and
selecting, from a customer pool, the plurality of customers who have purchased items in the at least one product type but have not provided any review for the purchased items, wherein the plurality of customers are selected based on transaction data and user session data associated with the customer pool.

3. The system of claim 2, wherein the review probabilities are computed based on:
generating the feature data based on: customer features, customer action features, benefit affinity data, transaction segmentation data, and reviewer segmentation data; and
inputting the feature data into the at least one machine learning model to compute, for each of the plurality of customers, a review probability that the customer will provide a review within the at least one product type.

4. The system of claim 1, wherein the reviewer segmentation data is generated based on:
obtaining historical review data of customers within a past time period;
determining segmentation metrics based on the historical review data, wherein the segmentation metrics comprise:
a review frequency indicating how many reviews a customer provided per order during the past time period, and
a review recency indicating a time period passed since a last review provided by a customer;
normalizing each of the segmentation metrics to generate normalized metrics;
generating buckets based on the normalized metrics; and
generating the reviewer segmentation data based on the buckets, wherein the reviewer segmentation data includes a plurality of reviewer segments, each of which corresponds to one or more of the buckets.

5. The system of claim 4, wherein:
each bucket is associated with a range boundary; and
the range boundaries of the buckets and a total quantity of the buckets are determined based on seasonal data and event data during the past time period.

6. The system of claim 1, wherein the ranked list of customers is generated based on:
selecting, from the plurality of customers, a list of customers whose review probabilities are higher than a predetermined threshold based on: (1) a product type determined based on the request and (2) a reviewer segment determined based on the request, wherein:
the review probabilities are computed with respect to the product type, and
the list of customers are selected from the reviewer segment; and
ranking the list of customers according to their respective review probabilities to generate the ranked list of customers based on budget data.

7. The system of claim 6, wherein the reviewer segment is determined based on:
determining, based on the request, an instruction for selecting customers, wherein the instruction indicates an exploration of new customers or an exploitation to increase a total number of reviews; and
determining the reviewer segment based on the instruction.

8. The system of claim 6, wherein the instructions, when executed, further cause the processor to:
send review reminders to customers in the ranked list, wherein:
the review reminders are sent via at least one of: an email, a text message, an app or a website, and
different review reminders are sent in different priorities according to rankings of the customers in the ranked list based on the budget data.

9. A computer-implemented method, comprising:
receiving a request for potential reviewers;
selecting, based on the request, a plurality of customers who have purchased items but have not provided any review for the purchased items;
computing, using at least one machine learning model, review probabilities based on feature data related to the plurality of customers and transactions involving the purchased items, wherein each review probability is a review probability of a corresponding customer providing a review for a respective product type, wherein the at least one machine learning model comprises a multi-task neural network including:
an input layer configured to receive the feature data;

a feature concatenation layer configured to concatenate features of the feature data to generate concatenated features;

a feed forward layer configured to fit the concatenated features and convert them into a multi-dimensional vector for each of the plurality of customers; and a plurality of task specific hidden layers each of which corresponds to a respective task for the respective product type, wherein each respective task is performed by a respective fully connected neural network in a corresponding feed forward layer to predict the review probability for the respective product type;

generating, from the plurality of customers, a ranked list of customers based on the review probabilities and reviewer segmentation data; and transmitting to a computing device the ranked list of customers to be reminded for providing reviews.

10. The computer-implemented method of claim 9, wherein selecting the plurality of customers comprises:

determining, based on the request, at least one product type; and selecting, from a customer pool, the plurality of customers who have purchased items in the at least one product type but have not provided any review for the purchased items, wherein the plurality of customers are selected based on transaction data and user session data associated with the customer pool.

11. The computer-implemented method of claim 10, wherein computing the review probabilities comprises:

generating the feature data based on: customer features, customer action features, benefit affinity data, transaction segmentation data, and reviewer segmentation data; and inputting the feature data into the at least one machine learning model to compute, for each of the plurality of customers, a review probability that the customer will provide a review within the at least one product type.

12. The computer-implemented method of claim 9, wherein generating the reviewer segmentation data comprises:

obtaining historical review data of customers within a past time period;

determining segmentation metrics based on the historical review data, wherein the segmentation metrics comprise:

a review frequency indicating how many reviews a customer provided per order during the past time period, and a review recency indicating a time period passed since a last review provided by a customer;

normalizing each of the segmentation metrics to generate normalized metrics;

generating buckets based on the normalized metrics; and generating the reviewer segmentation data based on the buckets, wherein the reviewer segmentation data includes a plurality of reviewer segments, each of which corresponds to one or more of the buckets.

13. The computer-implemented method of claim 12, wherein:

each bucket is associated with a range boundary; and the range boundaries of the buckets and a total quantity of the buckets are determined based on seasonal data and event data during the past time period.

14. The computer-implemented method of claim 9, wherein generating the ranked list of customers comprises:

selecting, from the plurality of customers, a list of customers whose review probabilities are higher than a predetermined threshold based on: (1) a product type determined based on the request and (2) a reviewer segment determined based on the request, wherein:

the review probabilities are computed with respect to the product type, and the list of customers are selected from the reviewer segment; and ranking the list of customers according to their respective review probabilities to generate the ranked list of customers based on budget data.

15. A non-transitory computer readable medium having instructions stored thereon, wherein the instructions, when executed by at least one processor, cause at least one device to perform operations comprising:

receiving a request for potential reviewers;

selecting, based on the request, a plurality of customers who have purchased items but have not provided any review for the purchased items;

computing, using at least one machine learning model, review probabilities based on feature data related to the plurality of customers and transactions involving the purchased items, wherein each review probability is a review probability of a corresponding customer providing a review for a respective product type, wherein the at least one machine learning model comprises a multi-task neural network including:

an input layer configured to receive the feature data;

a feature concatenation layer configured to concatenate features of the feature data to generate concatenated features;

a feed forward layer configured to fit the concatenated features and convert them into a multi-dimensional vector for each of the plurality of customers; and a plurality of task specific hidden layers each of which corresponds to a respective task for the respective product type, wherein each respective task is performed by a respective fully connected neural network in a corresponding feed forward layer to predict the review probability for the respective product type;

generating, from the plurality of customers, a ranked list of customers based on the review probabilities and reviewer segmentation data; and transmitting to a computing device the ranked list of customers to be reminded for providing reviews.

16. The non-transitory computer readable medium of claim 15, wherein selecting the plurality of customers comprises:

determining, based on the request, at least one product type; and selecting, from a customer pool, the plurality of customers who have purchased items in the at least one product type but have not provided any review for the purchased items, wherein the plurality of customers are selected based on transaction data and user session data associated with the customer pool.

17. The non-transitory computer readable medium of claim 16, wherein computing the review probabilities comprises:

generating the feature data based on: customer features, customer action features, benefit affinity data, transaction segmentation data, and reviewer segmentation data; and inputting the feature data into the at least one machine learning model to compute, for each of the plurality of customers, a review probability that the customer will provide a review within the at least one product type.

18. The non-transitory computer readable medium of claim 15, wherein generating the reviewer segmentation data comprises:

obtaining historical review data of customers within a past time period;

determining segmentation metrics based on the historical review data, wherein the segmentation metrics comprise:

a review frequency indicating how many reviews a customer provided per order during the past time period, and a review recency indicating a time period passed since a last review provided by a customer;

normalizing each of the segmentation metrics to generate normalized metrics;

generating buckets based on the normalized metrics; and generating the reviewer segmentation data based on the buckets, wherein the reviewer segmentation data includes a plurality of reviewer segments, each of which corresponds to one or more of the buckets, wherein:

each bucket is associated with a range boundary; and the range boundaries of the buckets and a total quantity of the buckets are determined based on seasonal data and event data during the past time period.

19. The non-transitory computer readable medium of claim 18, wherein:

each bucket is associated with a range boundary; and the range boundaries of the buckets and a total quantity of the buckets are determined based on seasonal data and event data during the past time period.

20. The non-transitory computer readable medium of claim 15, wherein generating the ranked list of customers comprises:

selecting, from the plurality of customers, a list of customers whose review probabilities are higher than a predetermined threshold based on: (1) a product type determined based on the request and (2) a reviewer segment determined based on the request, wherein:

the review probabilities are computed with respect to the product type, and the list of customers are selected from the reviewer segment; and ranking the list of customers according to their respective review probabilities to generate the ranked list of customers based on budget data.

* * * * *